United States Patent
Kano et al.

[11] Patent Number: 4,890,512
[45] Date of Patent: Jan. 2, 1990

[54] HYDRAULIC SERVO FOR FRICTION COUPLING ELEMENT OF AUTOMATIC TRANSMISSION

[75] Inventors: Takenori Kano, Anjo; Koji Kobayashi, Toyota; Koji Sumiya, Nishio; Seitoku Kubo; Kazuaki Watanabe, both of Toyota, all of Japan

[73] Assignees: Aisin-Warner Limited, Anjo; Toyota Jidosha Kabushiki Kaisha, Toyota, both of Japan

[21] Appl. No.: 144,703

[22] Filed: Jan. 12, 1988

Related U.S. Application Data
[63] Continuation of Ser. No. 763,005, Aug. 6, 1985, abandoned.

[30] Foreign Application Priority Data
Aug. 7, 1984 [JP] Japan .................. 59-166157

[51] Int. Cl.⁴ .................. F16H 37/00; F16H 3/44; F16H 57/10
[52] U.S. Cl. .................. 74/740; 74/753
[58] Field of Search .................. 192/87.1, 87.11, 87.12, 192/87.13, 87.14, 87.15, 87.16, 87.18, 87.19; 74/753, 740

[56] References Cited
U.S. PATENT DOCUMENTS

| | | | |
|---|---|---|---|
| 2,632,544 | 3/1953 | Hockert | 192/87.18 X |
| 2,868,341 | 1/1959 | Snoy | 192/87.18 X |
| 3,017,006 | 1/1962 | Dence et al. | 192/87.15 X |
| 3,265,175 | 8/1966 | Croswhite | 192/87.13 |
| 3,602,055 | 8/1971 | Hause et al. | 74/753 X |
| 3,710,650 | 1/1973 | Piret | 192/87.11 X |
| 3,772,940 | 11/1973 | Ohtsuka et al. | 192/87.15 X |
| 3,858,460 | 1/1975 | Porter et al. | 74/753 X |
| 3,913,616 | 10/1975 | Horsch | 192/87.1 X |
| 3,938,631 | 2/1976 | Smit | 192/87.12 X |
| 4,056,988 | 11/1977 | Kubo et al. | 74/740 X |
| 4,082,171 | 4/1978 | Lalin et al. | 192/87.11 X |
| 4,134,483 | 1/1979 | Horsch | 192/87.17 X |
| 4,237,749 | 12/1980 | Koivunen | 192/87.11 X |
| 4,241,622 | 12/1980 | Kubo et al. | 74/740 |
| 4,426,891 | 1/1984 | Kubo et al. | 74/740 |
| 4,607,541 | 8/1986 | Miura et al. | 74/753 X |
| 4,714,146 | 12/1987 | Moroto et al. | 192/87.11 |
| 4,753,132 | 6/1988 | Sumiya et al. | 192/87.1 |

FOREIGN PATENT DOCUMENTS

| | | | |
|---|---|---|---|
| 141949 | 11/1979 | Japan | 74/740 |
| 15150 | 1/1982 | Japan | 74/753 |
| 195962 | 12/1982 | Japan | 74/753 |
| 17253 | 2/1983 | Japan | 74/740 |
| 602399 | 3/1978 | U.S.S.R. | 192/85 AA |

Primary Examiner—Leslie A. Braun
Assistant Examiner—Harold F. Macris
Attorney, Agent, or Firm—Spencer & Frank

[57] ABSTRACT

Described herein is a hydraulic servo for a friction coupling element of an automatic transmission, which is mounted in association with a one-way clutch and which has reduced dimensions in radial and axial directions. The hydraulic servo essentially comprises: an annular drum splined with a sleeve portion of the inner race of the one-way clutch and arranged to receive the reaction of the one-way clutch by a fixed member in the automatic transmission case; a piston fitted in the annular drum; and a return spring mounted in the drum for returning the piston.

1 Claim, 8 Drawing Sheets

HYDRAULIC SERVO FOR FRICTION COUPLING ELEMENT OF AUTOMATIC TRANSMISSION

BACKGROUND OF THE INVENTION (i) Field of the Invention:

This application is a continuation of application Ser. No. 763,005, filed Aug. 6, 1985, now abandoned.

This invention relates to a hydraulic servo for a friction coupling element of an automatic transmission which is mounted in association with a one-way brake.

(ii) Description of the Prior Art:

Heretofore, the hydraulic servo for a friction coupling element of an automatic transmission is constituted by an annular drum having an outer cylinder, an inner cylinder and a side wall connecting the two cylinders and fixedly or rotatably mounted in the transmission case, a piston fitted between the outer and inner cylinders of the drum, and a return spring located outward of the outer cylinder or on a wall portion of the piston, coupling and releasing the friction element by supplying and draining line pressure to and from a chamber between the drum and piston.

In such a vehicular automatic transmission, the inner race of a one-way brake F2 which is engaged, for example, in the first speed has its inner peripheral portion fixedly welded to the annular drum of a brake B2, and the hydraulic drum is arranged to receive the reaction of the inner race of the one-way brake F2 at an integrally cast outer peripheral portion by a fixed member in the automatic transmission case.

The inner race of the one-way brake F2 of the above-described construction is fixedly welded to the inner cylinder of the hydraulic drum at predetermined portions on its outer peripheral side, so that a difficulty is sometimes encountered in positioning same on the outer peripheral side. In addition, since the inner race is connected to the inner cylinder of the hydraulic drum at predetermined inner peripheral portions, there has been a problem that it is difficult to secure a suitable wall thickness for the inner race.

SUMMARY OF THE INVENTION

It is an object of the present invention to provide a hydraulic servo for a friction element of and automatic transmission, which can overcome the abovementioned difficulties or problems.

Figure 1:
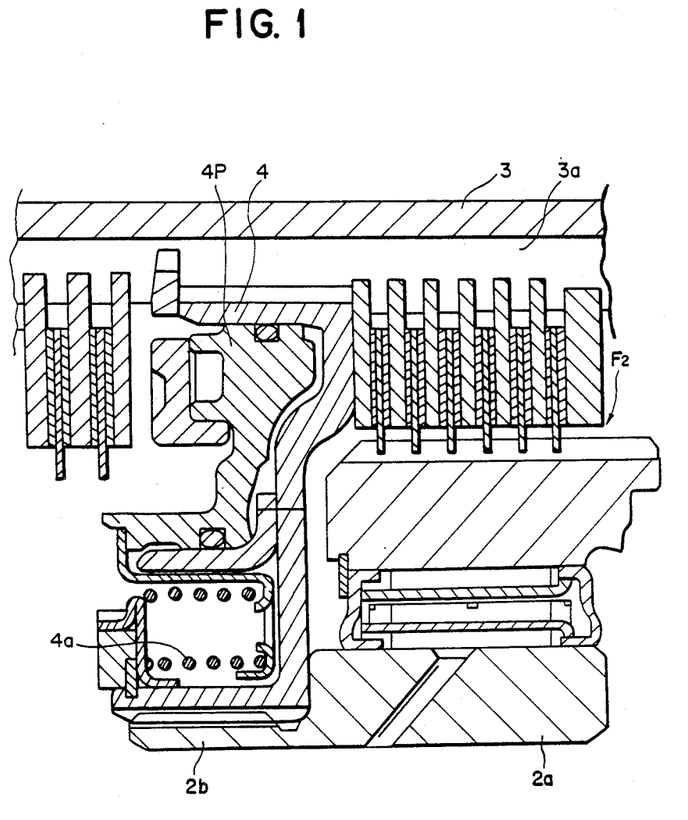
FIG. 1 a schematic section of a hydraulic servo for a friction coupling element of an automatic transmission, according to the invention.

According to the present invention, there is provided a hydraulic servo 1 for a friction coupling element of an automatic transmission, which includes as shown in FIG. 1: an annular drum 4 splined with a sleeve portion 2b of an inner race 2a of a one-way brake F2 and adapted to receive the reaction of the one-way brake F2 by a fixed member 3a in an automatic transmission case 3; a piston 4P provided in the annular drum 4; and a return spring 4a for the piston 4P.

An automatic transmission incorporating for its friction coupling element a hydraulic servo with the above-described construction according to the invention has the following advantages.

(a) By receiving the reaction of the inner race 2a of the one-way brake F2 by the fixed member in the transmission case through splined engagement with the annular drum 4, it becomes possible to use a compact end bearing for centering the outer and inner races of the one-way brake and to reduce the axial dimensions of the automatic transmission.

(b) Since the drum is splined with the sleeve portion of the inner race on its inner peripheral side, the inner and outer races can be formed in suitable wall thicknesses to provide a construction which is compact also in the radial direction.

The above and other objects, features and advantages of the invention will become apparent from the following description and the appended claims taken in conjunction with the accompanying drawings which show by way of example a preferred embodiment of the invention.

DESCRIPTION OF PREFERRED EMBODIMENTS

Hereafter, the hydraulic servo of the invention which is suitable for use with a friction coupling element of a vehicular automatic transmission is described more particularly by way of the preferred embodiment shown in the FIGS. 2 through 16.

Figure 2:
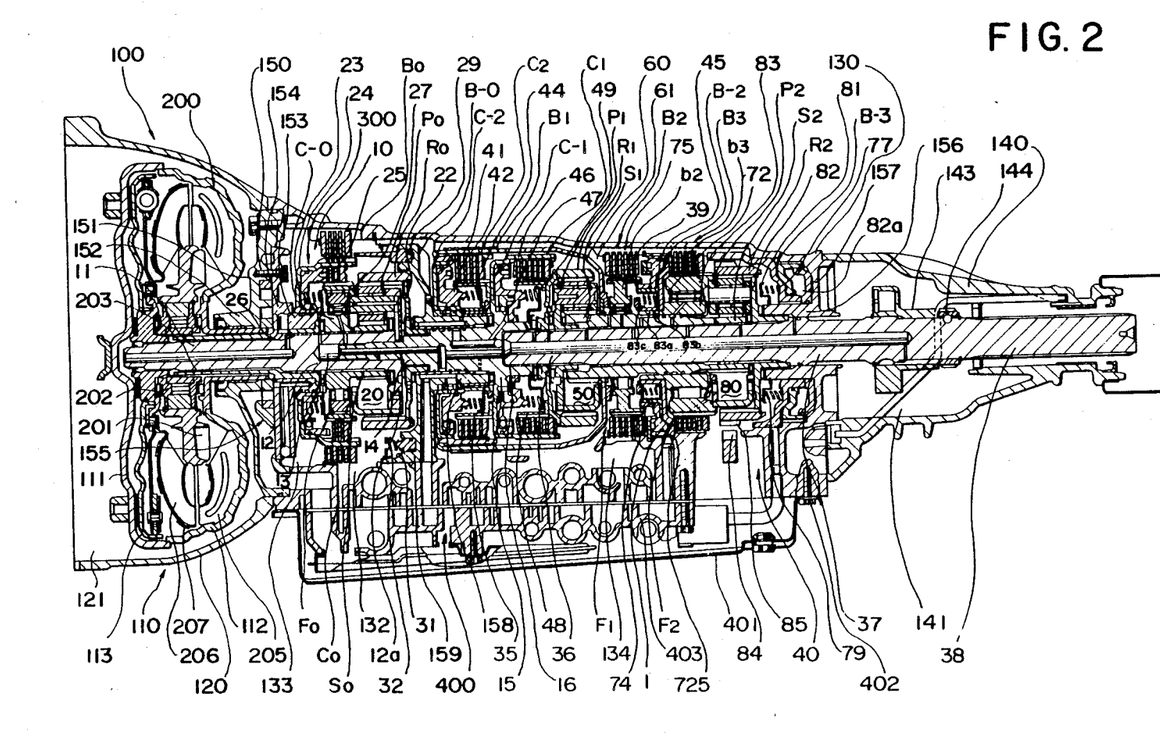
FIG. 2 is a schematic section of an automatic transmission incorporating the hydraulic servo according to the invention.

Referring to FIG. 2, there is shown a vehicular automatic transmission 100 which includes a fluid coupling 200 (a torque converter in the particular embodiment shown), a transmission 300, and a hydraulic control system 400.

The transmission 300 consists of: an overdrive planetary gear transmission 10 including a first planetary gear set 20, and multiple disk clutch C0, a multiple disk brake B0 and a one-way brake F0 which are operated by hydraulic servos; and an underdrive planetary gear transmission with three forward speed and one reverse speed ranges, including a second planetary gear set 50, a third planetary gear set 80, and two multiple disk clutches C1 and C2, a belt brake B1, two multiple disk brakes B2 and B3, and two one-way brakes F1 and F2 which are operated by hydraulic servos.

The case 110 of the automatic transmission 100 includes: a torque converter housing 120 accommodating a torque converter 200; a transmission case 130 accommodating in series the overdrive planetary gear transmission and the underdrive planetary gear transmission; and an extension housing 140 covering the rear side of the automatic transmission 100. The torque converter housing 120, transmission case 130 and extension housing 140 are fastened together by a number of bolts.

The torque converter 200 is received in a torque converter room 121 of the torque converter housing 120, which is open on the front side (on the side of the engine), and includes: a front cover 111 coupled with the output shaft of the engine; a rear cover 112 in the form of an annular plate welded at its outer periphery to the front cover 111; a pump impeller 205 provided on the inner wall around the inner periphery of the rear cover 112; a turbine runner 206 provided opposingly to the pump impeller 205; a turbine shell 207 retaining the turbine runner 206; a stator 201 supported on a fixed shaft 203 through a one-way clutch 202; and a direct coupling brake 113 (lock-up clutch) for directly coupling the front cover 111 with the turbine shell 207. Mounted between the torque converter room 121 and a cylindrical transmission room 132 of the transmission case 130 ensuing on the rear side of the converter room 121 is a gear type oil pump 150 and an annular oil pump casing 151 which is centrally provided with a forwardly extending cylindrical portion 152 and fastened to the front end face of the transmission case 130 through a spigot fit. Fastened to the rear side of the oil pump body 151 is an oil pump cover 154 with a rearwardly extending cylindrical front support 153 in coaxial relation with the afore-mentioned cylindrical portion 152. The oil pump casing 151 and oil pump cover 154 form an oil pump housing 155 which serves as a partition wall between the torque converter room 121 and the transmission room 132 and also as a front support wall for the transmission 300. Provided at a median position in the transmission room 132 of the transmission case 130 is an intermediate support wall 159 which is formed separately by casting, the intermediate support wall 159 partitioning the overdrive room 133 and the underdrive room 134 and being provided with a rearwardly extending cylindrical center support 158.

In a rear portion of the transmission case 130, a rear support wall 157 with a rearwardly extending cylindrical rear support 156 is formed integrally with the transmission case 130. Formed between the oil pump casing (the front support wall or partition wall) 155 and the rear support wall 157 is the transmission room 132 which receives the transmission 300, and formed between the rear support wall 157 and the extension housing 140 is an output shaft chamber 141 of the transmission. An electronically controlled sensor rotor 143 and a speedometer drive gear 144 are provided in the extension housing 140, and a sleeve yoke which is not shown is inserted in its rear end portion and coupled with a propeller shaft (not shown) in coaxial relation with the front support 153.

Rotatably supported in the front support 153, on the inner side of the fixed shaft 203, is an input shaft 11 of the transmission, which serves also as the output shaft of the torque converter 200. This input shaft 11 is formed in a larger diameter in its rear end portion 12 which is protruded rearward from the front support 153 and provided with a flange portion 12a, the rear end portion 12 being provided with a center hole 13 along its axis. An intermediate transmission shaft 14 is mounted rotatably in a position rearward of the input shaft 11 in series and coaxial relation therewith. The intermediate transmission shaft 14 is fitted in the center hole 13 at its fore end which is rotatable in sliding contact with the inner peripheral wall of the center hole 13 through a metal bearing (bushing), and formed in a larger diameter in its rear end portion 15 which is provided with a rearwardly opened center hole 16 along the axis thereof. An output shaft 36 is rotatably mounted rearward of and in series with the inter-mediate transmission shaft 14. This output shaft 36 is fitted in the center hole 16 at its fore end which is in sliding contact with the inner wall of the center hole 16 through a metal bearing. The output shaft 36 is splined in its intermediate portion 37 to a flange plate 82 with a rearwardly projecting shaft portion 81 in meshing engagement with the ring gear R2 of the third planetary gear set 80, and in its rear portion 38 to the afore-mentioned sleeve yoke, fixedly mounting the sensor rotor 143 and speedometer drive gear 144 in the output shaft room 141.

The first planetary gear set 20 is mounted rearward of the input shaft 11 in the overdrive room 133, having a ring gear R0 coupled with the intermediate transmission shaft 14 through the flange plate 22, a planetary carrier P0 coupled with the flange portion 12a of the input shaft 11 and a sun gear S0 formed on the inner race shaft 23. A rearwardly opened first hydraulic servo drum 24 is fixedly mounted on the inner race shaft 23 on the front side of the first planetary gear set 20, and an annular piston 25 is fitted between the outer peripheral wall of the drum and the inner race shaft 23 to form a hydraulic servo C-0 for the clutch C0, mounting a return spring 26 on the side of the inner race shaft 23 and the clutch C0 on the inner side of the outer peripheral wall and coupling with the planetary carrier P0 through the brake C0. A one-way clutch F0 having the inner race shaft 23 as its inner race is provided on the inner periphery of the first hydraulic servo drum 24 and, between an outer race 27 on its outer periphery and the transmission case 130, the clutch C0 and brake B0 are provided. A piston 29 is fitted in the front side of the center support wall 159 to form a hydraulic servo B-0 for the brake B0, and a return spring 32 is fitted in the inner periphery 31 of a fore end portion 31 of the intermediate support wall 159.

A rearwardly opened second hydraulic servo drum 41 is rotatably fitted on the center support 159 in a front portion of the underdrive room 134, and an annular piston 42 is fitted between its inner and outer peripheral walls to form a hydraulic servo C-2 for the clutch C2, mounting a return spring 44 on the side of the inner peripheral wall and the clutch C2 on the side of the outer peripheral wall. Behind the second hydraulic servo drum 41, a rearwardly opened third hydraulic servo drum 46 with an annular projection 35 on its front side is fixedly mounted on a rear end portion 15 of the intermediate transmission shaft 14. An annular piston 47 is fitted between the just-mentioned rear end portion 15 and the outer peripheral wall to form a hydraulic servo C-1 for the clutch C1, mounting a return spring 49 on the inner peripheral side of the clutch C1 and mounting the clutch C2 on the outer periphery of the annular projection 35. The second and third hydraulic servo drums 41 and 46 are coupled through the clutch C2. Provided behind the third hydraulic servo drum 46 is the second planetary gear set 50 having its ring gear R1 coupled with the third hydraulic servo drum 46 through the annular projection 48 and clutch C1, a planetary carrier P1 splined on a fore end portion of the output shaft 36, and a sun gear S1 formed integrally with the sun gear shaft 45. A connecting drum 60 which is so shaped as to cover the second and third hydraulic drums 41 and 46 and the second planetary gear set 50 in a minimum space is fixed at its fore end to the outer periphery of the second hydraulic servo drum 41, and connected at its rear end to the sun gear shaft 45 at a position behind the second planetary gear set 50, with a belt brake B1 on the outer periphery thereof.

Brake disks b2 of the brake B2, outer spline 725 of a fourth hydraulic servo drum 72 and brake disks b3 of the brake B3 are fitted from the front side in spline 75 which is formed on the inner side of the transmission case 130 behind the brake B2, and a piston 77 is fitted in an annular hole between the outer periphery of the rear support 156 of the rear support wall 157 and the transmission case 130 to form a hydraulic servo B-3 for the brake B3, supporting the return spring 79 of the hydraulic servo B-3 by a retainer 82a which is mounted at the fore end of the rear support 156.

The third planetary gear set 80 has a sun gear S2 formed integrally with the sun gear shaft 45, a carrier P2 coupled with the outer race 86 of the forwardly located clutch F2 and with the brake B3 and a ring gear R2 provided with a parking gear 85 around the circumference thereof and coupled with an intermediate portion 37 of the output shaft 36. When the shiftlever of the automatic transmission is set in "parking" (P) position, the parking gear 85 is meshed with a parking pawl 84 to fix the output shaft 36.

Figure 3:
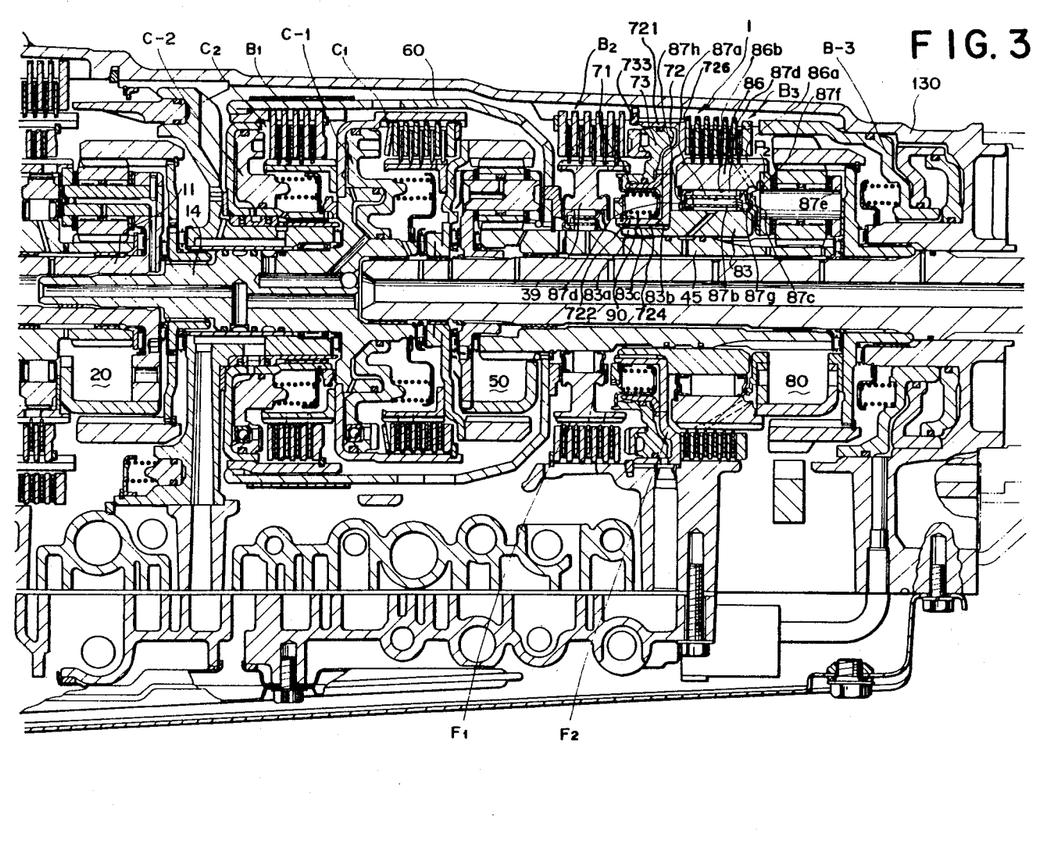
FIG. 3 is an enlarged schematic section showing major components of the transmission of FIG. 2.

As shown in FIG. 3, the hydraulic servo 1 according to the invention is associated with the one-way brake F1 located on the inner side of the brake B2 and having the sun gear shaft 45 as its inner race and having its outer race 39 connected to the brake B2 and the one-way brake F2 splined with the fourth hydraulic servo drum, which will be described herein-later, through an outer spline 83c formed on the outer peripheral side 83b of its sleeve portion 83a. The one-way brake F2 coupled at its side portion with the planetary carrier P2 of the third planetary gear set 80, and the outer spline 86a formed on its outer periphery includes an outer race 86 which is coupled with the transmission case 130 through the brake B3 and an inner race 83. Mounted between the inner and outer races 83 and 86 are annular apertured cages 87a and 87b and a multitude of sprags 87d retained in the window of an apertured spacing spring 87c. The one-way brake F2 further includes an end bearing 87h having on an annular support wall 87e outer peripheral ribs 87f for sliding engagement with an inner peripheral wall 86b of the outer race 86 and inner peripherhal 87a for sliding engagement with an outer peripheral wall 83d of the inner race. The hydraulic servo of the invention is mounted in an extra space 61 behind the connecting drum 60 on the outer side of the second planetary gear set 50, the hydraulic servo 1 including an annular fourth hydraulic servo drum 72 including: a press-formed intermediate cylinder 71 projected from a pre- determined position in the fourth hydraulic servo drum 72 and joined to the latter through a weld 71A to prevent oil leaks from the hydraulic servo; an annular piston 73 fitted between the intermediate cylinder 71 and the outer cylinder 721 of the fourth hydraulic servo drum 72; and return springs 74 mounted between the inner peripheral wall of the fourth hydraulic servo drum 72 and the intermediate cylinder 71; forming a hydraulic servo B-2 for the brake B2 by the fourth hydraulic servo drum 72, piston 73 and return springs 74 and mounting the brake B2 on the inner side of the outer peripheral wall. The intermediate cylinder 71 has a diameter which defines a suitable area for the piston 73.

Figures 4, 5:
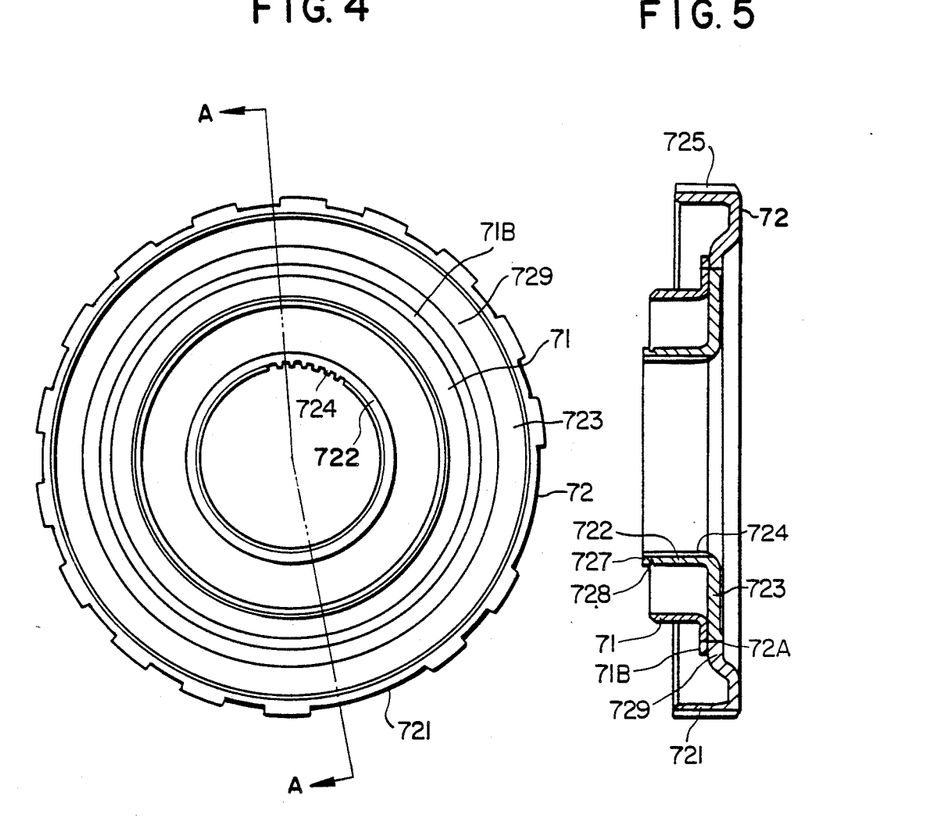
FIG. 4 is a front view of a hydraulic servo drum of the hydraulic servo according to the invention.
FIG. 5 a schematic section taken on line A—A of FIG. 4.
Figure 6:
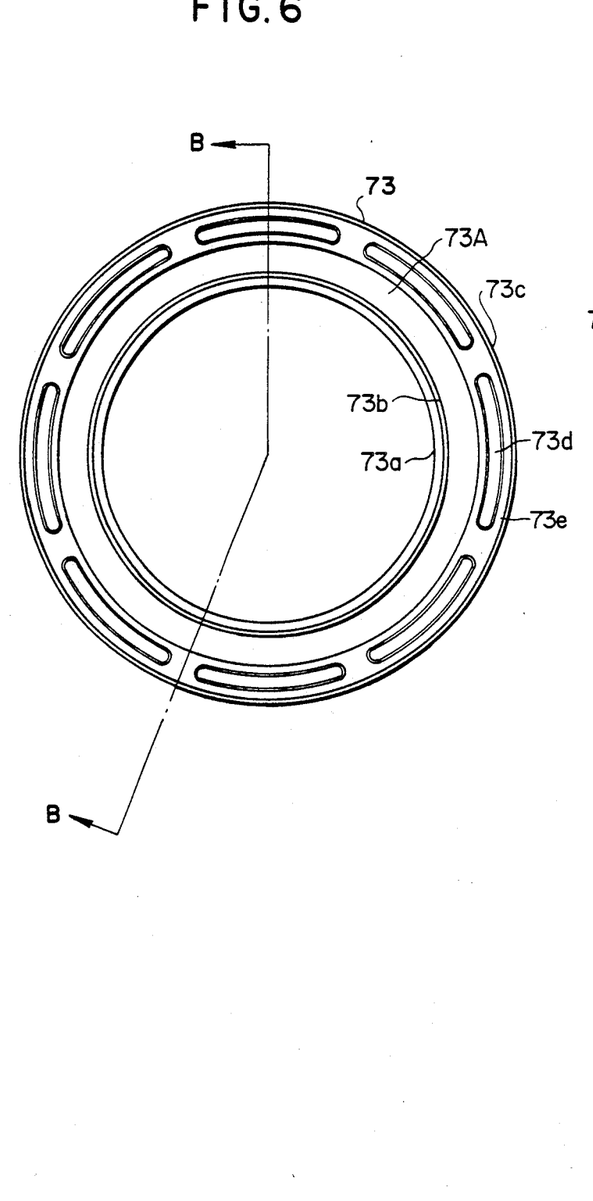
FIG. 6 is a front view of a piston employed by the hydraulic servo according to the invention.
Figure 7:
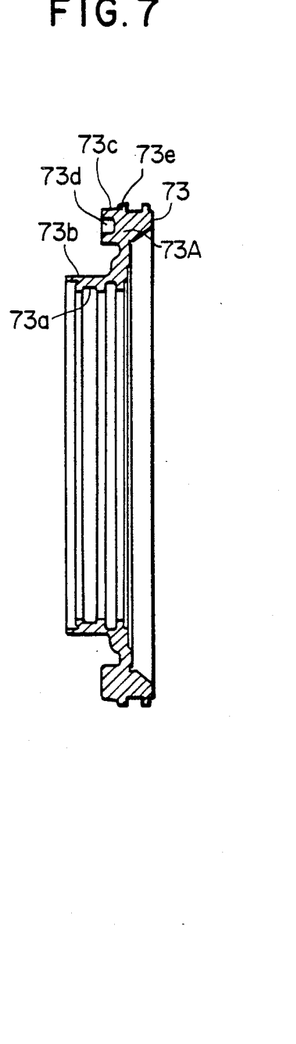
FIG. 7 is a schematic section taken on line B—b of FIG. 6.
Figure 8:
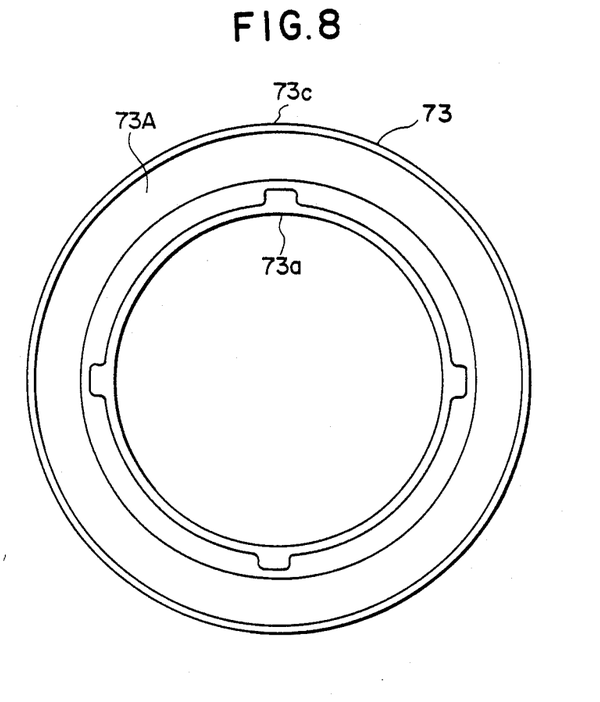
FIG. 8 is another sectional view of the piston employed by the hydraulic servo of the invention.
Figure 9:
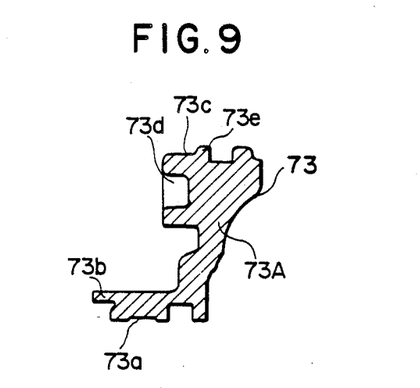
FIG. 9 is an enlarged sectional view of the piston of FIG. 7.

As shown in FIGS. 4 and 5, the fourth hydraulic drum 72 consists of the outer cylinder 721, inner cylinder 722 and a side wall 723 connecting the outer and inner cylinders, and is press-formed in U-shape in section, formed with an inner spline 724 on the inner periphery by machining for splined engagement with outer spline 83c on the outer periphery 83b of the sleeve 83a of the inner race 83 of the one-way brake F2 and with an outer spline 725 on its outer periphery for splined engagement with the spline 75 of the transmission case 130, the drum being fixed to the transmission case 130 in the rotational direction by the outer spline 725 to receive the reaction of the inner race 83 of the one-way brake F2 on the transmission case, and fixed in the axial direction by a snap ring in the form of a tapered ring 733 and a stepped portion 726 formed on the transmission case 130 to serve as a backing plate which receives the pressure behind the hydraulic servo B-2 at the time of engagement of the brake B3, supporting the axial pressure by the tapered ring 733. Further, a ring groove 728 is formed at one end 727 of the inner cylinder 722 for fixedly mounting return springs which will be described hereinlater. The intermediate cylinder 71 is similarly press-formed and joined to an intermediate portion 729 of the side wall 723 of the fourth hydraulic servo drum 72 through a weld 71A to prevent leaks of oil pressure from the hydraulic from the hydraulic servo.

Figures 10, 11, 12:
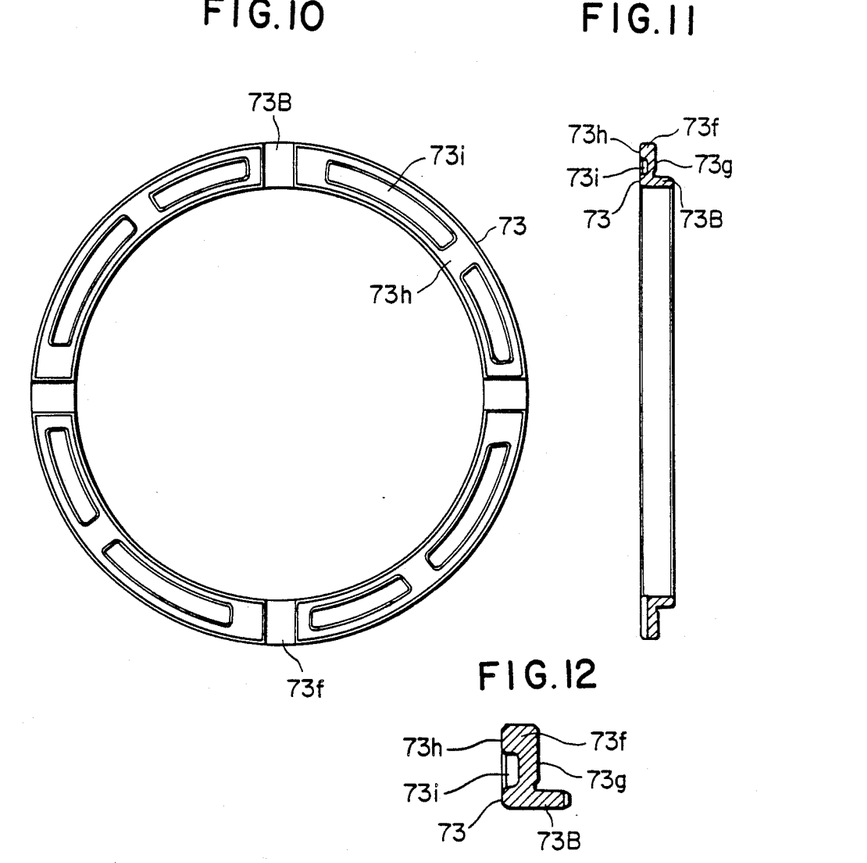
FIG. 10 is a sectional view of an adaptor sleeve.
FIG. 11 is a front view of the adaptor sleeve of FIG. 10.
FIG. 12 a sectional view of the adaptor sleeve of FIG. 11.
Figure 13:
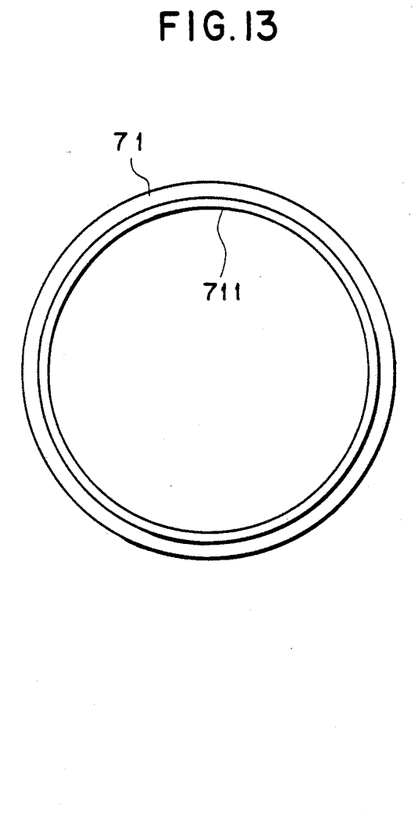
FIG. 13 is a front view of an intermediate cylinder member of the hydraulic servo according to the invention.
Figure 14:
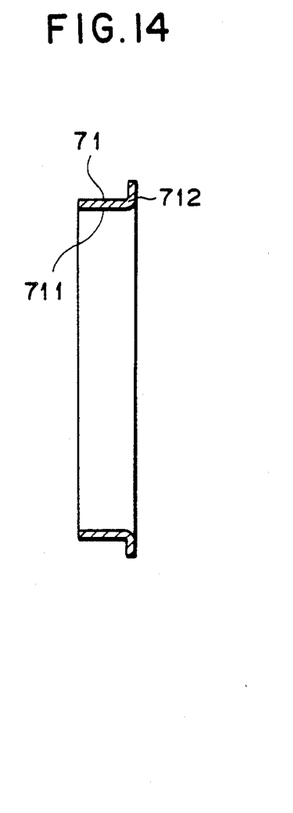
FIG. 14 is a sectional view of the intermediate cylinder member of FIG. 13.
Figure 15:
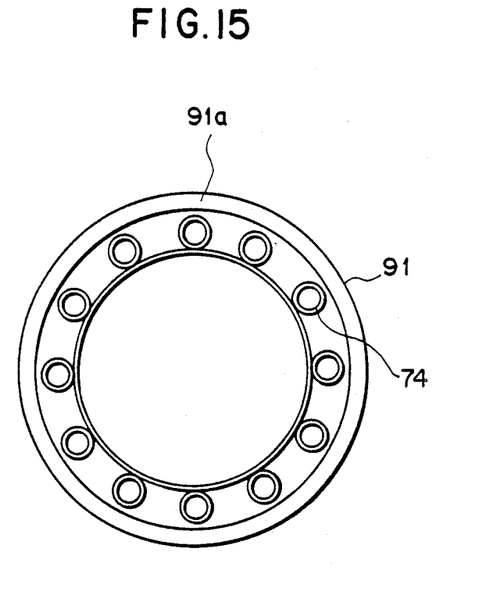
FIG. 15 is a front view of a connecting member and a return spring of the hydraulic servo of the invention.
Figure 16:
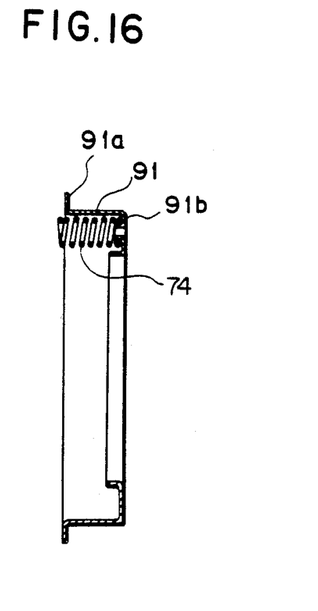
FIG. 16 is a sectional view of the parts shown in FIG. 15.
Figures 17, 18:
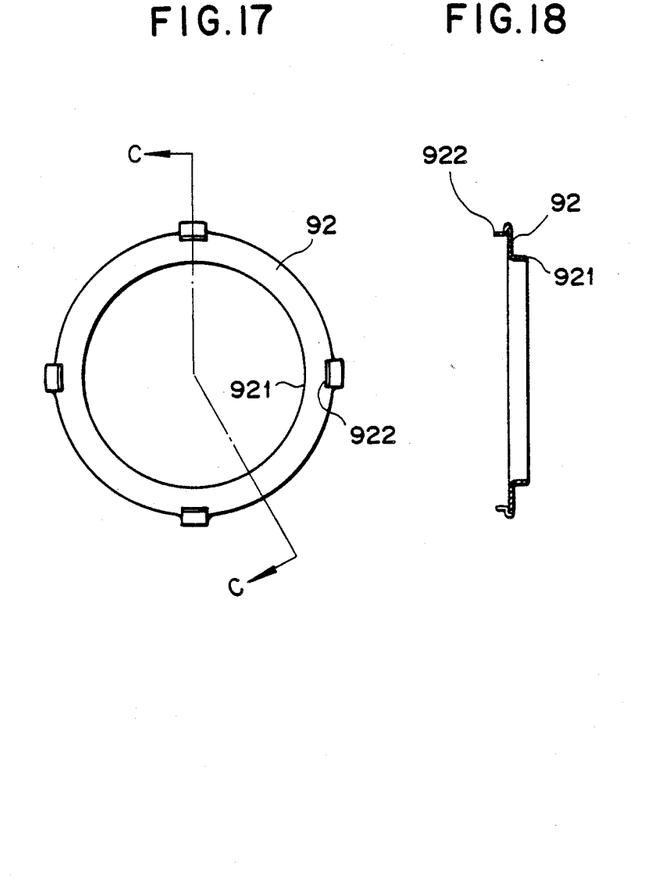
FIG. 17 is a front view of a retainer of the hydraulic servo according to the invention.
FIG. 18 is a section taken on line C—C of FIG. 16.

As shown in FIGS. 6 to 9, the piston 73 is fitted between the outer cylinder 721 and the intermediate cylinder member 71, and includes: a piston body 73a having a connecting member, which will be described hereinlater, secured to an end face 73b of its inner peripheral side 73a, and an end portion 73e having a forwardly open (open to the left in the drawing) hole 73d on the outer peripheral side 73c; and an adaptor sleeve 732 covering the end portion 73e of the piston body 73A with a rear side 73g (on the right side in the drawing) of an L-shaped wall portion 73f as shown in FIGS. 10 to 12.

As shown in FIGS. 13 through 18, the return spring 74 is mounted between: a connecting member 91 having one end 91a thereof fixed to the end face 73b of the inner peripheral side 73a of the piston 73 and the other end 91b folded to extend along the inner periphery 711 of the intermediate cylinder 71 and around the other end thereof; and a retainer 92 having one end 921 thereof secured to the snap ring 95 fixed in the ring groove 728 of the intermediate cylinder 71 and around the other end thereof; and a retainer 92 having one end 921 thereof secured to the snap ring 95 fixed in the ring groove 728 of the intermediate cylinder 71 and the other end 922 folded into engagement with the outer periphery 941 of a ring 94 which is fixed by the snap ring 95.

The piston 73 and return spring 74 form parts of the fourth hydraulic servo drum integrally with the retainer 92 and snap ring 95 in the drum 72 can be easily assembled into the transmission case 130.

The transmission 300 engages or releases the respective clutches and brakes by the oil pressure which is selectively supplied to the hydraulic servoes of the friction coupling elements according to the vehicle speed, throttle opening or other operating conditions of the vehicle by the hydraulic control system 400 in a valve casing 403 in an oil pan 401 which is fastened to the lower side of the transmission case 130 by bolts 402, thereby effecting shifts to and from four forward and one reverse speed ranges. Table 1 below shows one example of speed ranges established by engagement and release of the respective clutches, brakes and one-way brakes.

TABLE 1

| RANGES | | Clutches | | | Brakes | | | | OWB | | |
|---|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ |
| P | | E | X | X | X | X | X | X | f | f | f |
| R | | E | X | E | X | X | X | E | f | f | f |
| N | | E | X | X | X | X | X | X | f | f | f |
| D | 1 | E | E | X | X | X | X | X | (L) | f | L |
|   | 2 | E | E | X | X | X | E | X | (L) | L | f |
|   | 3 | E | E | E | X | X | E | X | (L) | f | f |
|   | 4 | X | E | E | E | X | E | X | f | f | f |
| S | 1 | E | E | X | X | X | X | X | (L) | f | L |
|   | 2 | E | E | X | X | E | E | X | (L) | (L) | f |
|   | 3 | E | E | E | X | X | E | X | (L) | f | f |
| L | 1 | E | E | X | X | X | X | E | (L) | f | (L) |
|   | 2 | E | E | X | X | E | E | X | (L) | (L) | f |

In Table 1, the letter "E" indicates an engaged state of the corresponding clutch or brake, and "L" indicates that the corresponding one-way brake is engaged only in engine-drive operation and not in engine-brake operation. Further, the letter "(L)" indicates a "locked" state in which the corresponding one-way brake is engaged in engine-drive operation but its engagement is not necessarily required since the power is delivered by a parallelly mounted clutch or brake. The small letter "f" indicates a free state of the corresponding one-way brake, and the cross "X" indicates a released state of the corresponding clutch or brake.

What is claimed is:

1. A hydraulic servo for a friction coupling element of an automatic transmission comprising
    (a) a brake arranged to be engaged in second, third and fourth speed, and including:
        (1) an annular drum connected to an automatic transmission case with a spline and having an outer cylinder, an inner cylinder, and inner spline formed on an inner periphery of said inner cylinder and a side wall connected between the outer and inner cylinders;
        (2) a piston provided in the annular drum;
        (3) a return biasing means mounted in the annular drum for returning the piston; and
    (b) a one-way brake arranged to be unlocked in second, third and fourth speed and including:
        (1) an inner race having a sleeve portion and an outer spline formed on an outer peripheral side of said sleeve portion to engage with the inner spline of the inner cylinder;
        (2) an outer race connected to one element of a planetary gear set forming part of said transmission and being connected to the transmission case in first speed;
        (3) an end bearing disposed between said inner race and said outer race; and
        (4) a plurality of sprags disposed between the inner race and the outer race.

* * * * *